E. E. P. CLAUSOLLES.
Apparatus for Measuring Liquids, &c.
No. 166,502. Patented Aug. 10, 1875.
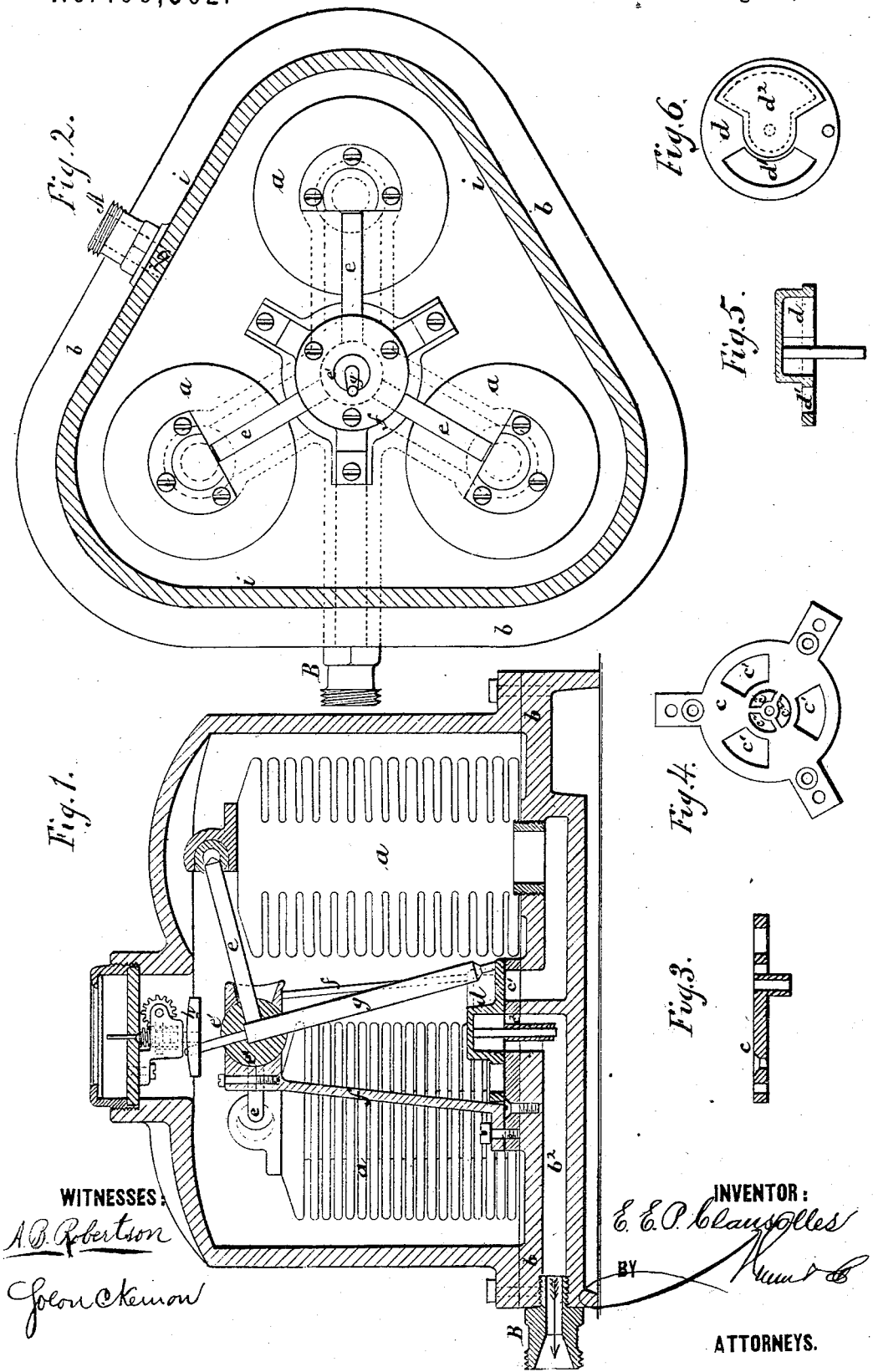

UNITED STATES PATENT OFFICE.

EMILE E. P. CLAUSOLLES, OF BARCELONA, SPAIN.

IMPROVEMENT IN APPARATUS FOR MEASURING LIQUIDS, &c.

Specification forming part of Letters Patent No. 166,502, dated August 10, 1875; application filed April 26, 1875.

*To all whom it may concern:*

Be it known that I, EMILE EUGENE PIERRE CLAUSOLLES, of Barcelona, Spain, doctor of medicine, have invented certain new and useful improvements in apparatus for measuring liquids for obtaining motive power and for exhausting and forcing air and gases; and I hereby declare the following to be a full, clear, and exact description thereof, reference being had to the annexed drawings forming part of this specification.

This improved apparatus consists of three or other convenient number of metallic or other bellows, formed of annular disks or plates with leather or other joints, which are in communication with the ingress and egress passages formed in the foundation-plate of a box. The bellows are united by the arms of a compound lever, which vibrates in a spherical recess in a fixed stand, and the lower end of the axis of this compound lever communicates a rotary motion to a circular valve, which opens and closes the ingress and egress ports, and the upper end of the axis gives motion to the index-dials or to a rotary shaft for transmitting power or to pumps. The metallic or other bellows are made to contain a certain fixed quantity of liquid, and the pressure on the liquid to be measured causes the said bellows to expand and collapse alternately.

Figure 1 is a sectional elevation, and Fig. 2 a plan, of my improved apparatus for measuring liquids; and Figs. 3, 4, 5, and 6 are detached portions of the same.

$a\ a\ a$ are three circular or other shaped bellows, made of annular disks or plates of metal, soldered or otherwise connected together at their edges. The object in making the bellows of thin disks of metal, instead of leather or other flexible material, is to render the same more durable, and prevent the passage of liquids therethrough, the thin metal affording sufficient elasticity, and yet not being open to the objections to porous or fibrous material.

All the bellows are attached to the foundation-plate $b$, in which is the egress-passage $b^2$. The ingress-passage $b^1$ is placed by preference in the side of the box $i$. The egress-passage $b^2$ is in communication with the three-way valve, shown detached in Figs. 3, 4, 5, and 6. The seating $c$ of the valve is shown in Figs. 3 and 4. The larger ports marked $c^1$ are in communication with the bellows $a$, and the smaller ports $c^2$ communicate with the egress-passage $b^2$. The valve $d$, shown in Figs. 5 and 6, fits on the seating $c$, and is kept central by the stud projecting from the valve fitting in a hole in the seating. This valve has a port, $d^1$, which forms the communication between the ingress-passage and the bellows, and the port $d^2$, which communicates with the egress-passage $b^2$. At the upper end of each bellows is a socket to receive the balls at the ends of the arms of the compound lever $e$, which serves to unite all the bellows. The arms of this compound lever are fixed in the center ball $e^1$, which vibrates in a spherical recess in the fixed stand $f$, screwed to the valve-seating or to the foundation-plate. The ball $e^1$ is fixed to the axle $g$, at the lower end of which is a pin fitting into a hole in the valve $d$. The upper end of the axle $g$ takes into the lever $h$, which is fixed on the axle of a worm, which communicates motion to the ordinary index-dials. The whole apparatus is inclosed by the case $i$, which is secured to the foundation-plate $b$.

The mode of operation is as follows: The liquid to be measured is supposed to be entering at A, (see Fig. 2,) and when the liquid has filled all the space in the box $i$ it passes through the port $d^1$, which is always in communication with one of the bellows. The first bellows are then expanded, and in rising they impart by the compound lever $e$ and spindle $g$ a partial rotary motion to the valve $d$, which then admits the liquids into the second bellows. When the first bellows are fully expanded the second bellows continue to impart the rotary motion to the valve, which brings the port $d^2$ over the port $c^1$, which communicates with the first bellows, the fluid from which is thus conveyed through the ports $c^1$ and $c^2$ to the egress-passage $b^2$ and B. As the second bellows continue to expand the third begin to receive their share of fluid, and when the third are fully expanded the second begin to discharge, and so the operations are repeated, the valve $d$ continuing to rotate over the seating $c$, and opening and closing the ports as required. When the three bellows have been expanded in succession the spindle $g$ will have performed one revolution, which is recorded on the usual index-dials, and as each bellows contain a certain fixed quantity of fluid it is evident that the said quantities passing through the machine will be measured and recorded. When the apparatus is used for obtaining motive power the liquid or fluid under pressure expands the bellows, and the upper part of the spindle $g$, in revolving, imparts the requisite rotary motion to a driving-shaft, and, when the apparatus is applied for exhausting and forcing air and gases, power is applied to the end of the upright spindle $g$, thereby actuating the bellows in succession, and thus exhausting or forcing a constant current of air or gas.

Having thus stated the nature of my invention and described the manner of performing the same, I declare that what I claim herein as new, and desire to secure by Letters Patent of the United States, is—

1. The bellows $a$, constructed of thin disks of metal, connected at their edges by solder or otherwise, substantially as described.

2. The combination, with the valve $d$, of the spindle $g$, central ball-and-socket joint $e^1$, lever $e$, and the bellows $a$, as and for the purpose specified.

In testimony whereof I have hereto set my hand before two subscribing witnesses.

EMILE EUGENE PIERRE CLAUSOLLES.

Witnesses:
JNO. WILSON,
J. NORTON.